US012741481B2

(12) United States Patent
Huang

(10) Patent No.: US 12,741,481 B2
(45) Date of Patent: Sep. 22, 2026

(54) PAINT TOOL WITH REPLACEABLE BLADE

(71) Applicant: Chin-Chen Huang, Taichung (TW)

(72) Inventor: Chin-Chen Huang, Taichung (TW)

( * ) Notice: Subject to any disclaimer, the term of this patent is extended or adjusted under 35 U.S.C. 154(b) by 93 days.

(21) Appl. No.: 18/802,960

(22) Filed: Aug. 13, 2024

(65) Prior Publication Data

US 2026/0048612 A1 Feb. 19, 2026

(51) Int. Cl.
*B44D 3/16* (2006.01)
*A47L 13/022* (2006.01)
*A47L 13/08* (2006.01)

(52) U.S. Cl.
CPC ............ *B44D 3/164* (2013.01); *A47L 13/022* (2013.01); *A47L 13/08* (2013.01)

(58) Field of Classification Search
CPC ....... A47L 13/08; A47L 13/022; B44D 3/164; B26B 21/30; B26B 21/18; B26B 21/08
USPC .......................... 30/169–174; 15/236.1, 93.1
See application file for complete search history.

(56) References Cited

U.S. PATENT DOCUMENTS 2,748,415 A * 6/1956 Rushing, Jr. ........... A01B 1/225 30/286
3,769,653 A * 11/1973 Lopez ....................... B60S 1/38 15/250.454
4,238,883 A * 12/1980 Jacobson ................ B26B 5/005 30/162
8,726,966 B1 * 5/2014 Liao ........................ B44C 7/027 30/169

* cited by examiner

*Primary Examiner* — Liang Dong

(57) ABSTRACT

The present invention is a paint tool with a replaceable blade, comprising: a main body, a blade, and two side covers. The main body comprises a support surface, a blade retaining flange, and two engagement recesses, with an insertion slot formed between the support surface and the blade retaining flange. The blade is detachably assembled with the insertion slot, and at least one side cover comprises a first cover body and a second cover body. The second cover body is detachably disposed on one side of the first cover body and corresponds to the insertion slot. When the second cover body is detached, the blade can be disengaged from the insertion slot along a first direction. Thus, the present invention provides the advantages of simple disassembly and easy blade replacement.

9 Claims, 13 Drawing Sheets

PAINT TOOL WITH REPLACEABLE BLADE

FIELD OF INVENTION

The present invention relates to a paint tool with an easily replaceable blade, more particularly to a structure that allows the blade to be removed from an insertion slot by detaching a second cover body.

BACKGROUND OF THE INVENTION

Conventionally, paint scrapers are used to smooth a pre-painted surface, and generally consist of a handle and a blade.

As in the paint tool hanging structure disclosed in Republic of China Patent No. I737416, a removable side cover allows the blade to be removed laterally, solving the problem of conventional paint tools that require manual tools to disassemble the blade. However, to prevent the side cover from falling off when hanging, it is connected to an engagement recess via a secondary engagement mechanism and multiple locating protrusions. While this prevents the side cover from easily separating from the main body, it also increases the difficulty of removing the side cover, causing inconvenience when the blade needs to be replaced.

SUMMARY OF THE INVENTION

To overcome the foregoing disadvantages, the present invention provides a paint tool in which a blade can be easily replaced by detaching a second cover body and exposing an insertion slot, so that the blade can be removed from the insertion slot.

The present invention is a paint tool with a replaceable blade, comprising a main body, the blade, and two side covers. The main body comprises a grip section, a support surface, a blade retaining flange, and two engagement recesses. The grip section and the blade retaining flange are disposed at the top and bottom of one side of the support surface, respectively. The insertion slot is formed between the support surface and the blade retaining flange, and the two engagement recesses are recessed on the two end faces of the main body, respectively. The blade comprises a cutting edge and a blade mounting portion connected to the cutting edge, with the blade mounting portion being detachably assembled with the insertion slot. The two side covers are assembled in the two engagement recesses, respectively, thereby preventing the blade from being disengaged from the insertion slot along a first direction. At least one of the side covers comprises a first cover body and the second cover body, with the second cover body being detachably disposed on one side of the first cover body and corresponding to the insertion slot. When the second cover body is detached, the blade can be disengaged from the insertion slot along the first direction.

To achieve the above and other purposes, the support surface of the present invention comprises a first side and a second side, and the insertion slot comprises an opening. The grip section and the blade retaining flange are disposed on the first side, and the opening faces the second side. A blade stop is located at the opening to restrict the blade from moving along a second direction where the second direction intersects the first direction.

To achieve the above and other purposes, an interlocking structure is provided between the first cover body and the second cover body of the present invention. The interlocking structure comprises an assembly slot and an interlocking member. At least one retention groove is provided in the assembly slot, and the interlocking member is used to be inserted into the assembly slot and interlocked with the retention groove.

To achieve the above and other purposes, the interlocking member of the present invention is inserted into the assembly slot along the second direction or a third direction, and both the second direction and the third direction intersect with the first direction.

To achieve the above and other purposes, the second cover body of the present invention also comprises a release mechanism.

To achieve the above and other purposes, the assembly slot of the present invention is further provided with a channel, and the retention groove is connected to the end of the channel. When the interlocking member is pushed by the inner wall of the channel, the interlocking member exhibits an elastically deformable contracted state, and when the interlocking member corresponds to the retention groove, the interlocking member returns to an initial state.

To achieve the above and other purposes, the interlocking member of the present invention comprises a pair of extending arms and a pair of interlocking protrusions. The pair of extending arms are made of an elastically deformable material and are spaced apart from each other. One end of the extending arms is connected to the second cover body, while the other end is connected to the interlocking protrusions.

To achieve the above and other purposes, the outer side of the interlocking protrusion of the present invention also comprises a connected first guide slope and second guide slope. The first guide slope is used to guide the interlocking member into the channel, and the second guide slope is used to guide the interlocking member out of the retention groove.

To achieve the above and other purposes, the maximum width of the interlocking member of the present invention is greater than the inner diameter of the channel.

To achieve the above and other purposes, at least one of the side covers of the present invention has a suspension element, which protrudes from the outer surface of the side cover.

The following detailed description, together with the accompanying drawings, will provide a better understanding of the technical features of the present invention.

DETAILED DESCRIPTION OF THE PREFERRED EMBODIMENTS

Figure 1:
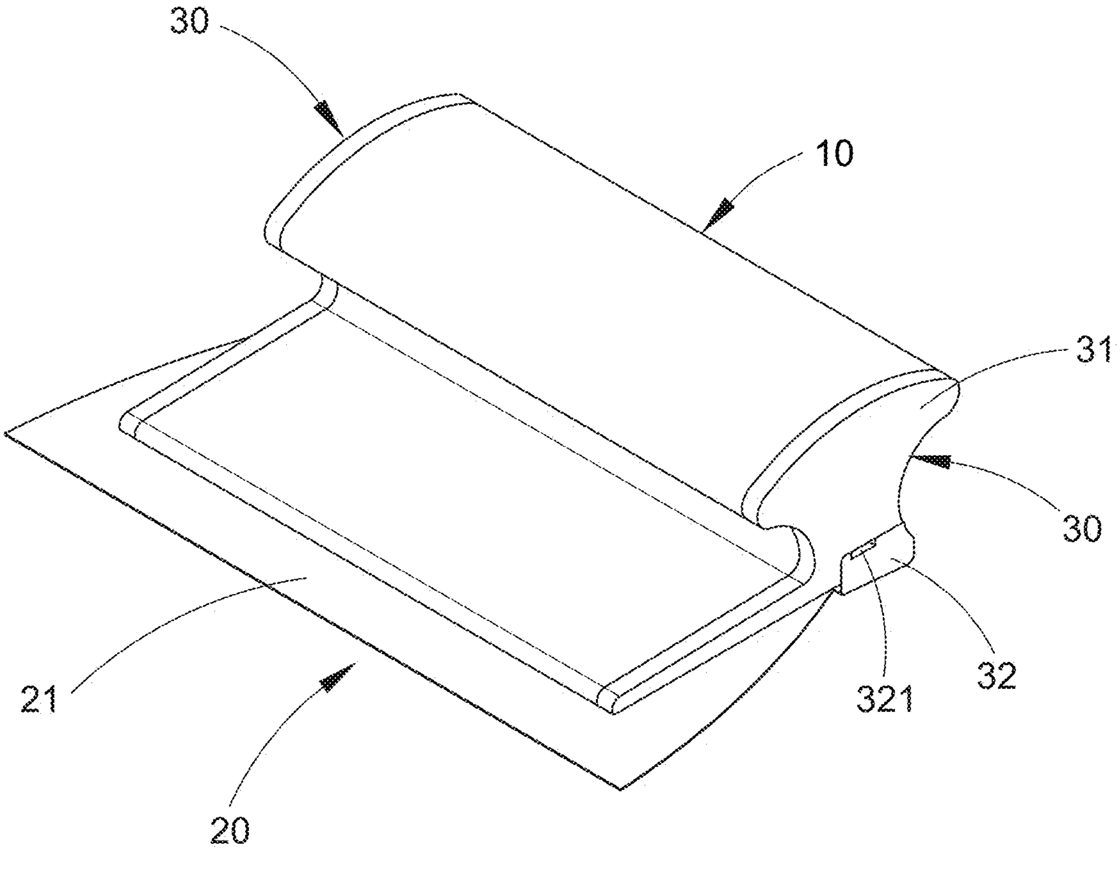
FIG. 1 is a schematic perspective view of the paint tool of the present invention.

Reference is made to FIGS. 1 to 9, which show a preferred embodiment of a paint tool with a replaceable blade of the present invention, comprising: a main body 10, a blade 20, and two side covers 30.

The main body 10 comprises a grip section 11, a support surface 12, a blade retaining flange 13, and two engagement recesses 14. The support surface 12 comprises a first side 12*a* and a second side 12*b*. The grip section 11 and the blade retaining flange 13 are disposed at the top and bottom of the first side 12*a* of the support surface 12, respectively, and an insertion slot 15 is formed between the support surface 12 and the blade retaining flange 13. The two engagement recesses 14 are recessed on the two end faces of the main body 10, respectively, and each engagement recess 14 has a primary engagement mechanism 141.

The opening of the insertion slot 15 faces the second side 12*b* of the support surface 12, and a blade stop 151 is provided at the opening. The blade stop 151 may be a long strip or multiple protrusions, which protrude from the upper surface of the insertion slot 15.

Figure 2:
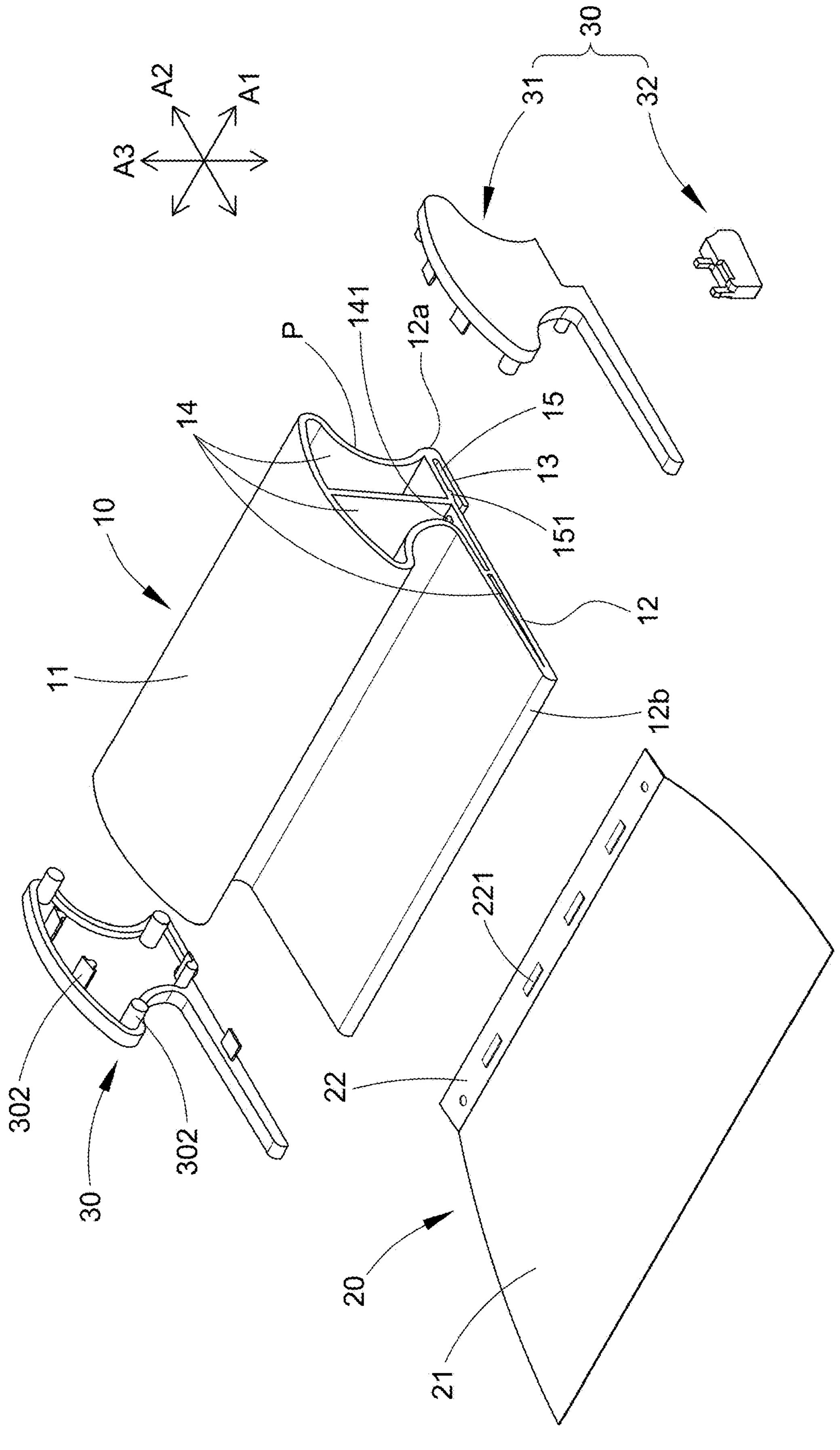
FIG. 2 is an exploded view of the paint tool of the present invention.
Figure 3:
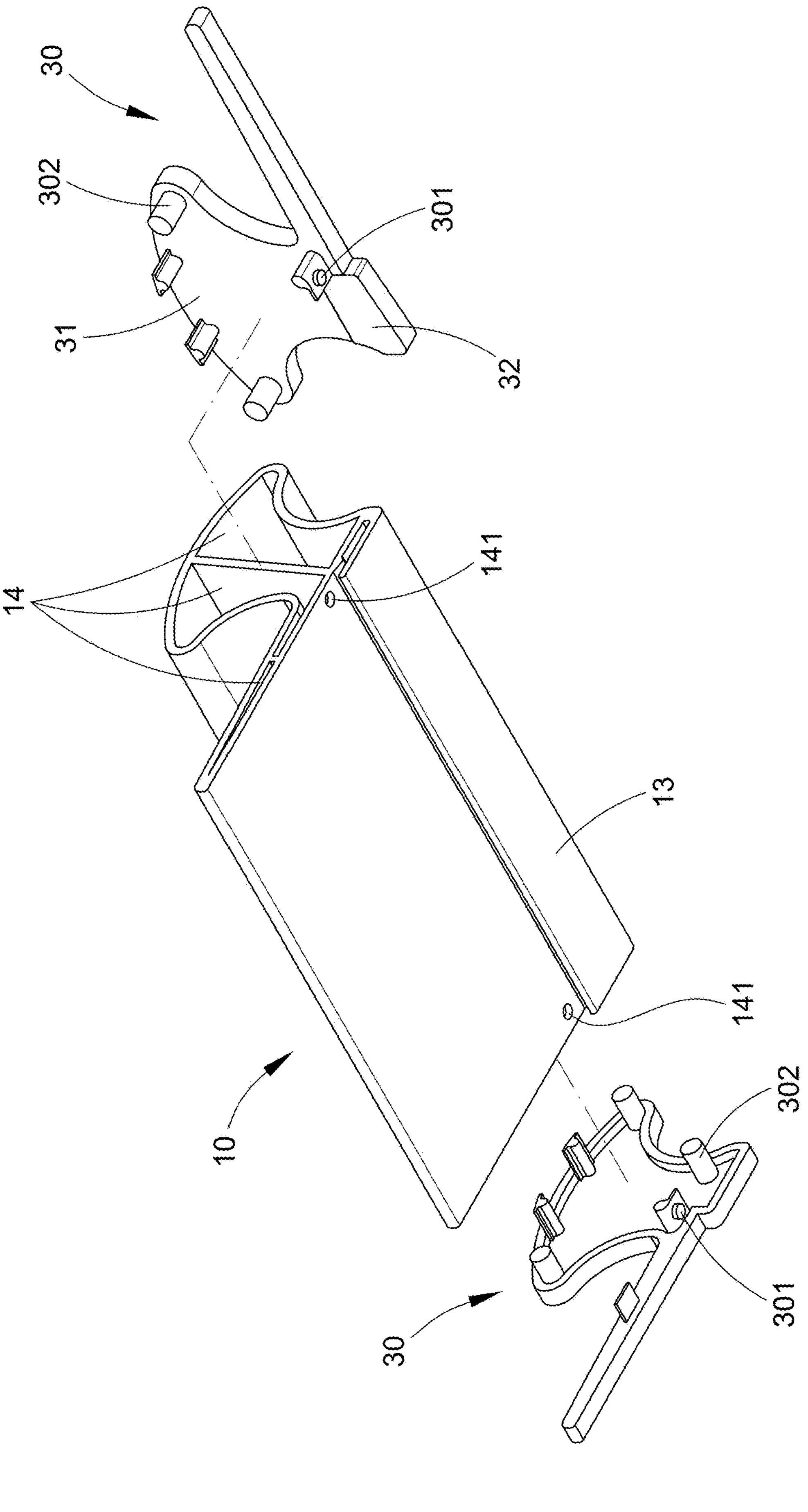
FIG. 3 is another angle exploded view of the paint tool of the present invention.

As shown in FIG. 2, in this embodiment, the top of the grip section 11 has a curved surface, while the two sides connecting the top and bottom of the grip section 11 form curved contours P, and the top of the grip section 11 is larger than the bottom. In this way, the curved shape of the curved contours P can fit the user's fingers for gripping, making the grip section 11 easy to hold. Furthermore, in the structural design of this embodiment, the main body 10 is a hollow structure with the two engagement recesses 14 connected to each other. The engagement recesses 14 are composed of multiple recessed holes in order to save manufacturing materials and reduce the weight of the main body 10.

The blade 20 comprises a cutting edge 21 and a blade mounting portion 22 connected to the cutting edge 21. The blade mounting portion 22 of the blade 20 is detachably assembled with the insertion slot 15 of the main body 10, and the blade mounting portion 22 has multiple alignment features 221 that can interlock with the blade stop 151 of the insertion slot 15. This allows the blade stop 151 to prevent the blade 20 from moving along a second direction A2, thereby firmly securing the blade 20 in the insertion slot 15. The multiple alignment features 221 are formed by stamping so as to protrude from the bottom surface to the top surface of the blade mounting portion 22, thereby facilitating the manufacturing process.

Figure 4:
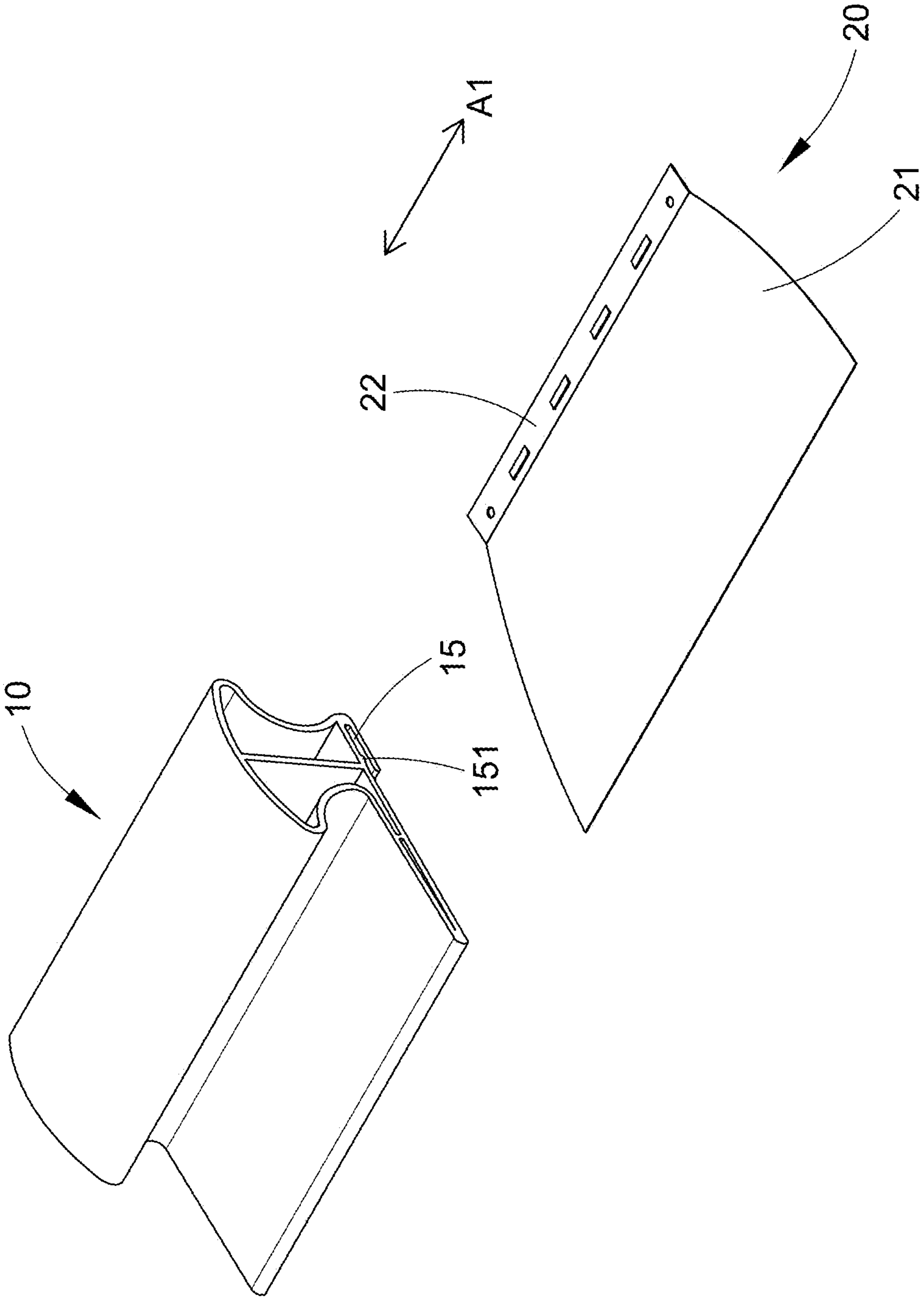
FIG. 4 is a schematic diagram of the first blade assembly method of the present invention.
Figure 5:
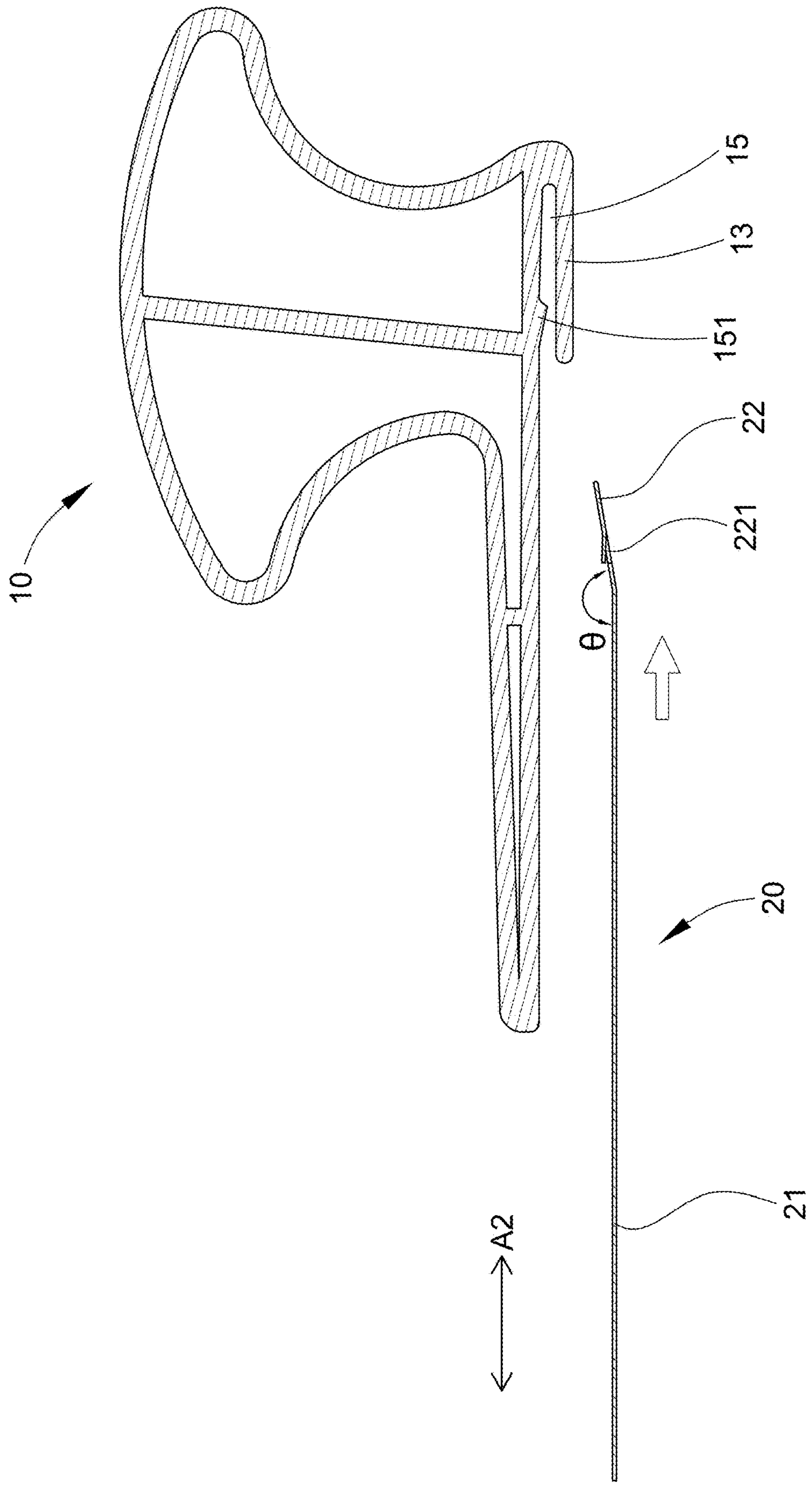
FIG. 5 is a schematic diagram of the second blade assembly method of the present invention.

As shown in FIGS. 4 and 5, when assembling the blade 20 of the present invention, it can be inserted into the insertion slot 15 along the second direction A2 or along a first direction A1 (the longitudinal direction of the insertion slot 15 intersecting with the second direction A2). Regardless of the assembly method, once the blade 20 is inserted, it is blocked by the blade stop 151 and cannot move along the second direction A2, and can only be released from the insertion slot 15 along the first direction A1.

Figure 6:
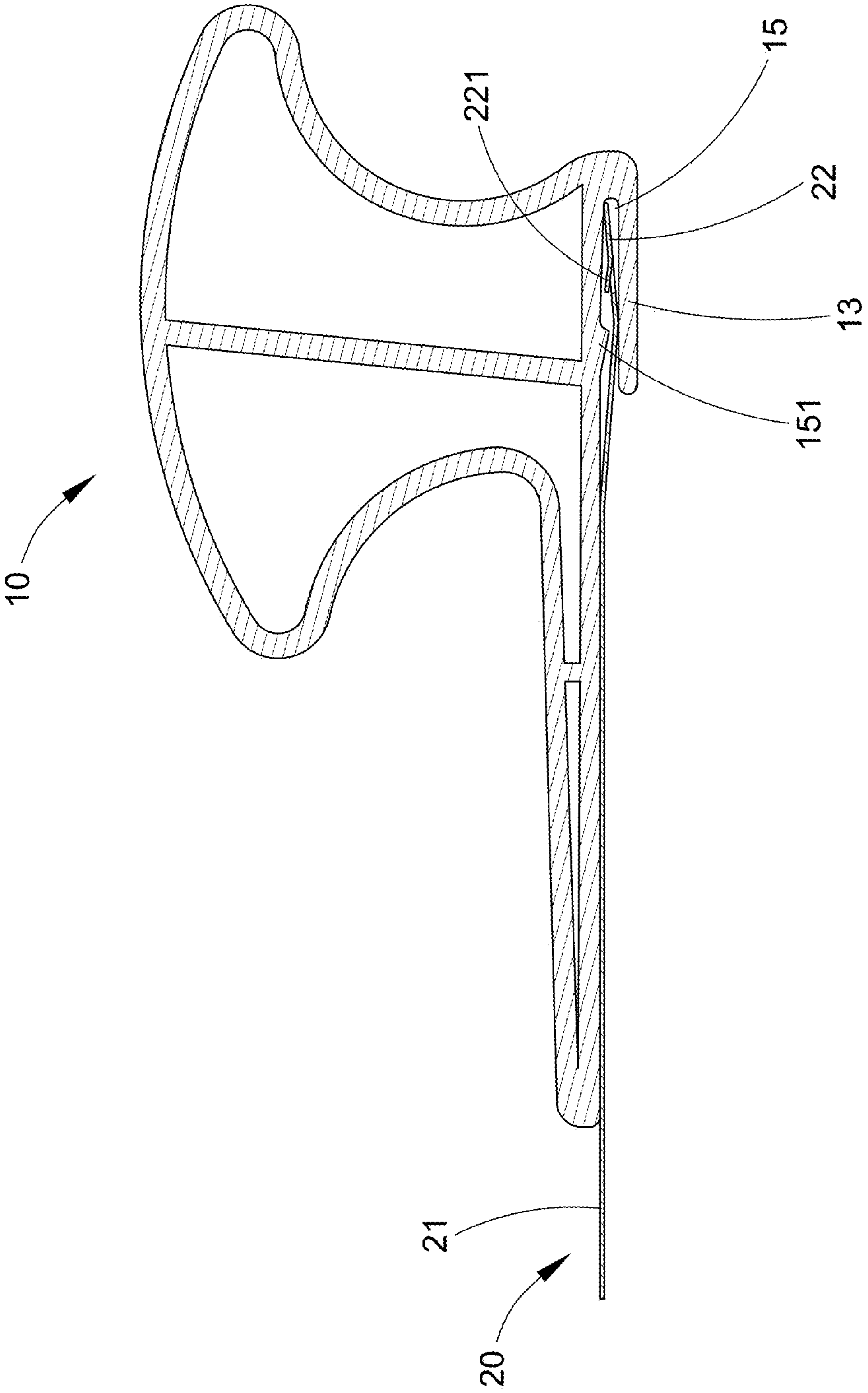
FIG. 6 is a sectional view of the paint tool of the present invention.

As shown in FIGS. 5 and 6, the cutting edge 21 can be used for smoothing walls or floors. There is an angle θ between the blade mounting portion 22 and the cutting edge 21, which is in the range of 150° to 170° (preferably 160°). When the blade mounting portion 22 is assembled with the insertion slot 15, the blade 20 can abut against the support surface 12.

The two side covers 30 are assembled in the two engagement recesses 14 of the main body 10, respectively, and prevent the blade 20 from disengaging from the insertion slot 15 along the first direction A1. Each side cover 30 has a secondary engagement mechanism 301 and multiple locating protrusions 302. The secondary engagement mechanism 301 is used to interlock with the primary engagement mechanism 141 of the engagement recess 14. The locating protrusions 302 can extend into the engagement recess 14 and fit complementarily, or they can adhere to the inner circumference of the engagement recess 14, thereby allowing the two side covers 30 to be connected to both end faces of the main body 10. For example, the primary engagement mechanism 141 can be a cylindrical through-hole (or groove) in the main body 10, while the secondary engagement mechanism 301 is a cylindrical protrusion. When the side cover 30 is assembled in the engagement recess 14, the cylindrical protrusion (secondary engagement mechanism 301) interlocks with the cylindrical through-hole (primary engagement mechanism 141) to form a concave-convex fit, thereby preventing the side cover 30 from easily separating from the main body 10.

It should be noted that due to the design of the secondary engagement mechanism 301 and the locating protrusions 302 of the side cover 30, the side cover 30 can be firmly assembled in the engagement recess 14, but it is also relatively difficult to disassemble, which causes inconvenience when removing the blade 20. To solve this issue, in this embodiment, one of the side covers 30 also comprises a first cover body 31 and a second cover body 32. The secondary engagement mechanism 301 and locating protrusions 302 are disposed on the first cover body 31, and the second cover body 32 is detachably disposed on one side of the first cover body 31 corresponding to the insertion slot 15 to cover one side of the insertion slot 15 and prevent the blade 20 from sliding along the first direction A1.

Figure 7:
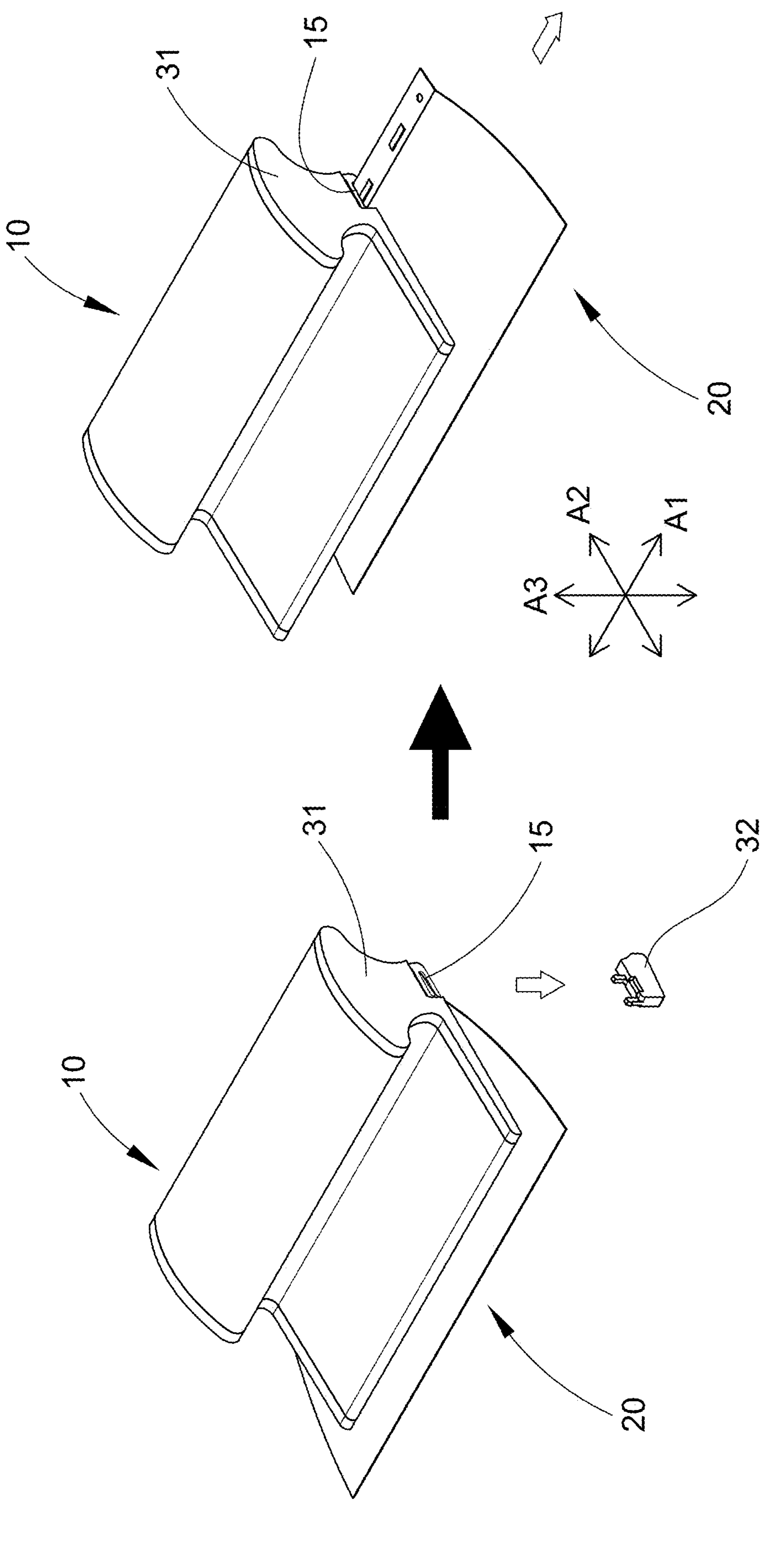
FIG. 7 is a schematic diagram of the blade removal action of the paint tool of the present invention.

In this way, when the blade 20 needs to be removed, only the second cover body 32 needs to be detached from the first cover body 31. This exposes one side of the insertion slot 15 without the need to remove the first cover body 31, allowing the blade 20 to be detached from the insertion slot 15 along the first direction A1 (as shown in FIG. 7).

Figure 8:
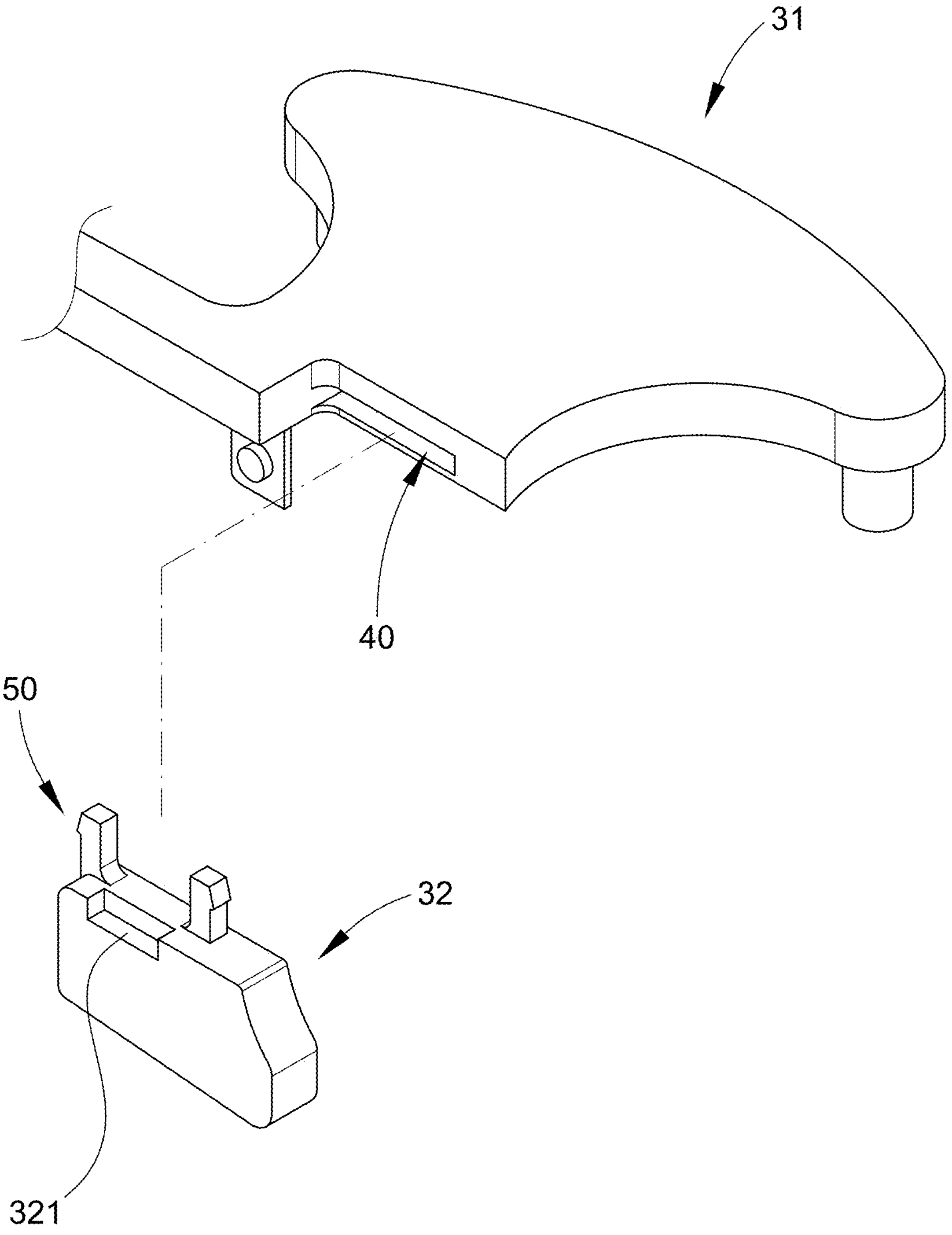
FIG. 8 is a schematic exploded view of the side cover of the present invention.
Figure 9:
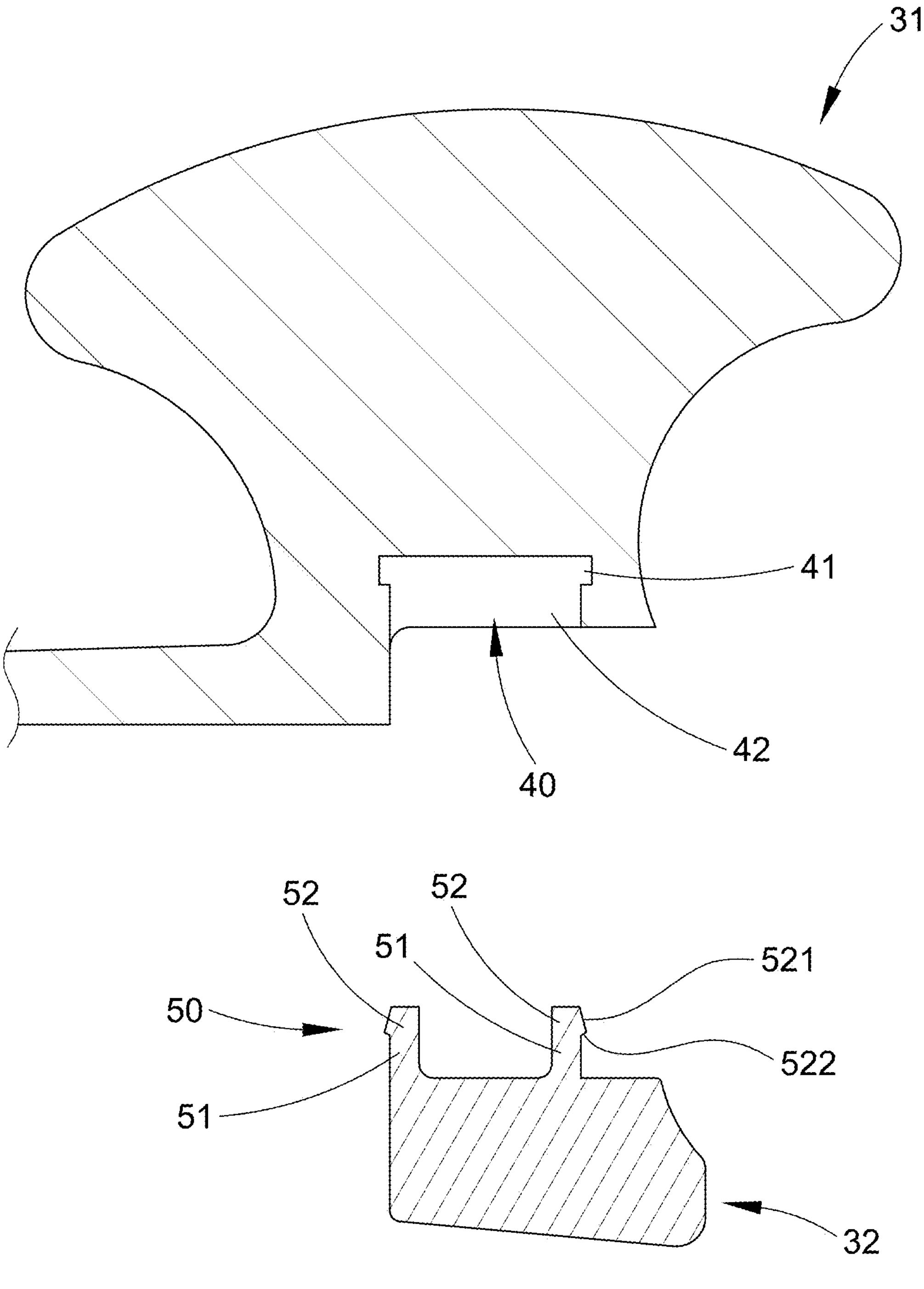
FIG. 9 is an exploded sectional view of the side cover of the present invention.
Figure 10:
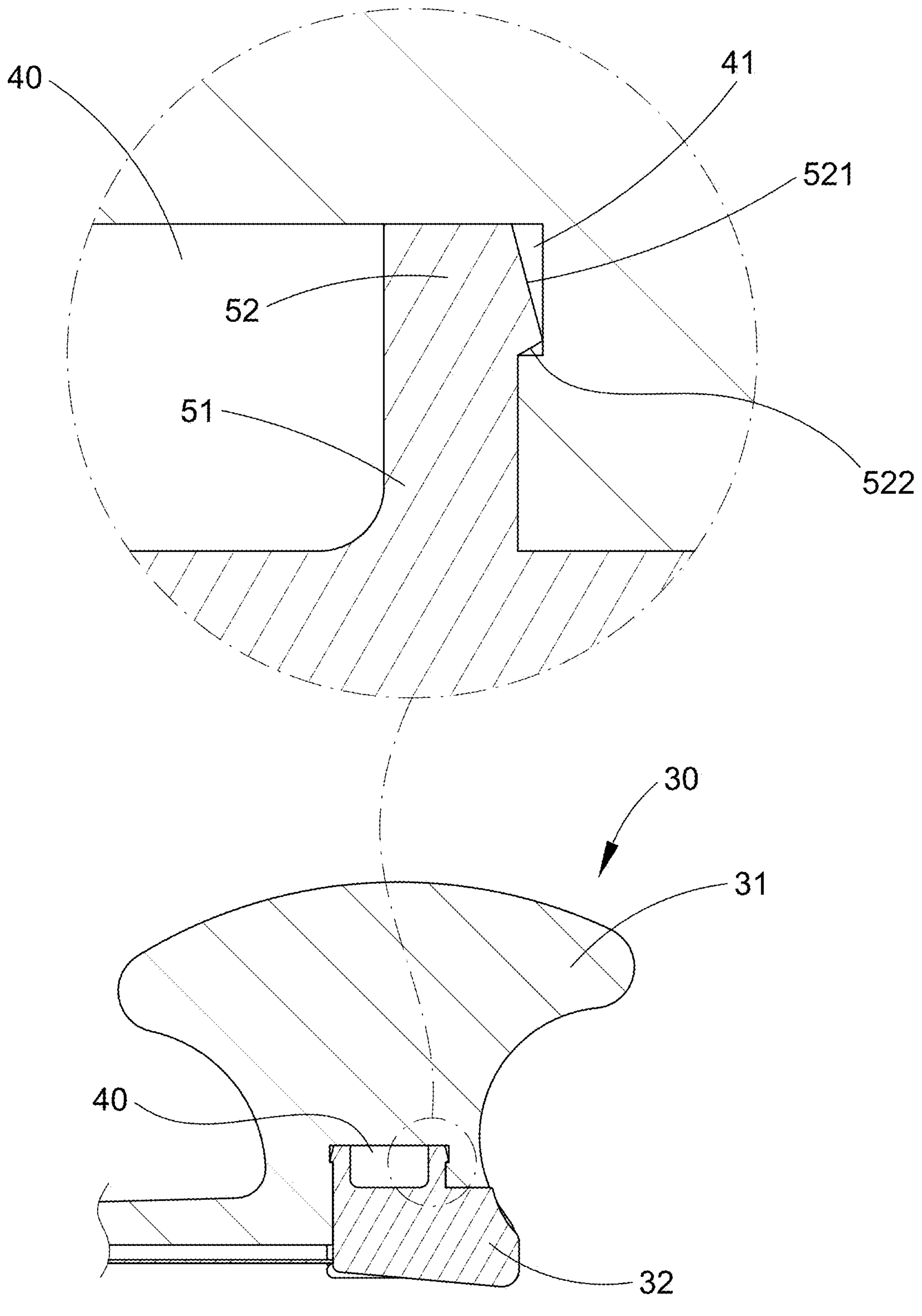
FIG. 10 is a sectional view after the first cover body and the second cover body of the present invention are interlocked.

To facilitate assembly and disassembly of the second cover body 32, an interlocking structure is provided between the first cover body 31 and the second cover body 32. As shown in FIGS. 8 to 10, the interlocking structure comprises an assembly slot 40 and an interlocking member 50. At least one retention groove 41 is provided in the assembly slot 40, and the interlocking member 50 is used to be inserted into the assembly slot 40 and interlocked with the retention groove 41. In this embodiment, the assembly slot 40 is located on the bottom side of the first cover body 31, while the interlocking member 50 is located on the top side of the second cover body 32. The interlocking member 50 is inserted into the assembly slot 40 along a third direction A3 (the third direction A3 intersects with the first direction A1).

More specifically, the assembly slot 40 is further provided with a channel 42, and the retention groove 41 is connected to the end of the channel 42. The interlocking member 50 comprises a pair of extending arms 51 and a pair of interlocking protrusions 52. The pair of extending arms 51 are made of an elastically deformable material and are spaced apart from each other. One end of the extending arms 51 is connected to the upper side of the second cover body 32, while the other end extends away from the second cover body 32 and is connected to the interlocking protrusions 52. The pair of interlocking protrusions 52 protrude from the outer sides of the pair of extending arms 51. The outer diameter formed by the pair of interlocking protrusions 52 is the maximum width of the interlocking member 50, and the maximum width of the interlocking member 50 is greater than the inner diameter of the channel 42. However, the present invention is not limited thereto. In other possible embodiments, the interlocking member 50 could also be a combination of a spring and a ball, which can achieve the same effects of elastic deformation and interlocking.

During the process of inserting the interlocking member 50 into the channel 42, the two interlocking protrusions 52 are pushed by the inner wall of the channel 42, compressing the pair of extending arms 51. This causes the pair of extending arms 51 to elastically deform and move closer to each other, forming a contracted state. After the interlocking member 50 is fully inserted into the channel 42, the interlocking protrusions 52 correspond to and interlock with the retention groove 41, thereby releasing the pair of extending arms 51 to return to their initial state.

Additionally, the second cover body 32 also comprises a release mechanism 321. In this embodiment, the release mechanism 321 is recessed on the upper side and front end face of the second cover body 32. When the second cover body 32 is assembled on the first cover body 31, the release mechanism 321 forms a recess between the first cover body 31 and the second cover body 32. Therefore, the user only needs to pull the release mechanism 321 with his finger to detach the second cover body 32 from the first cover body 31. However, the present invention is not limited thereto. In other possible embodiments, the release mechanism 321 could also protrude from the front end face of the second cover body 32.

As shown in FIG. 10, the outer side of the interlocking protrusion 52 also comprises a connected first guide slope 521 and second guide slope 522. The first guide slope 521 is used to guide the interlocking member 50 into the channel 42, while the second guide slope 522 is used to guide the interlocking member 50 out of the retention groove 41 of the assembly slot 40.

Figure 11:
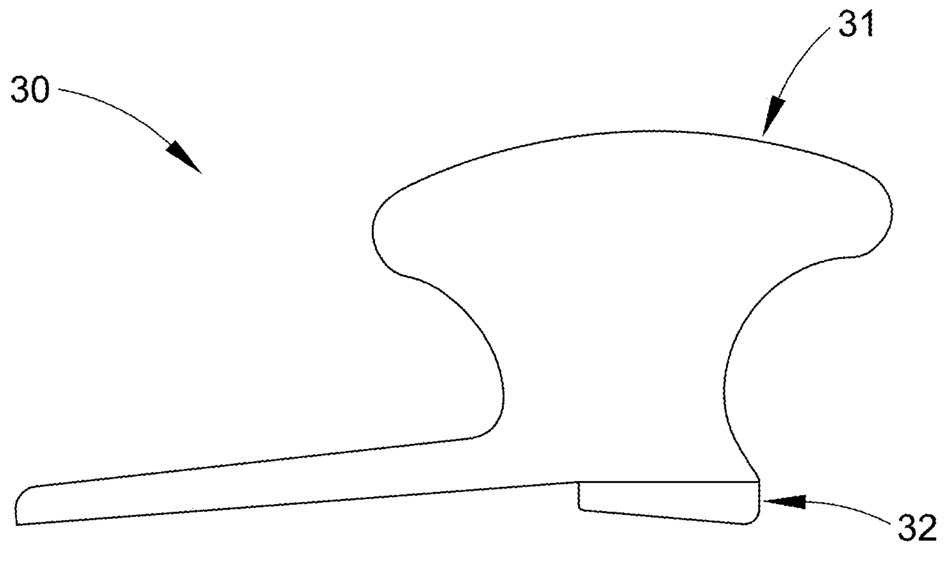
FIG. 11 is a schematic diagram of the side cover of the second embodiment of the present invention.
Figure 12:
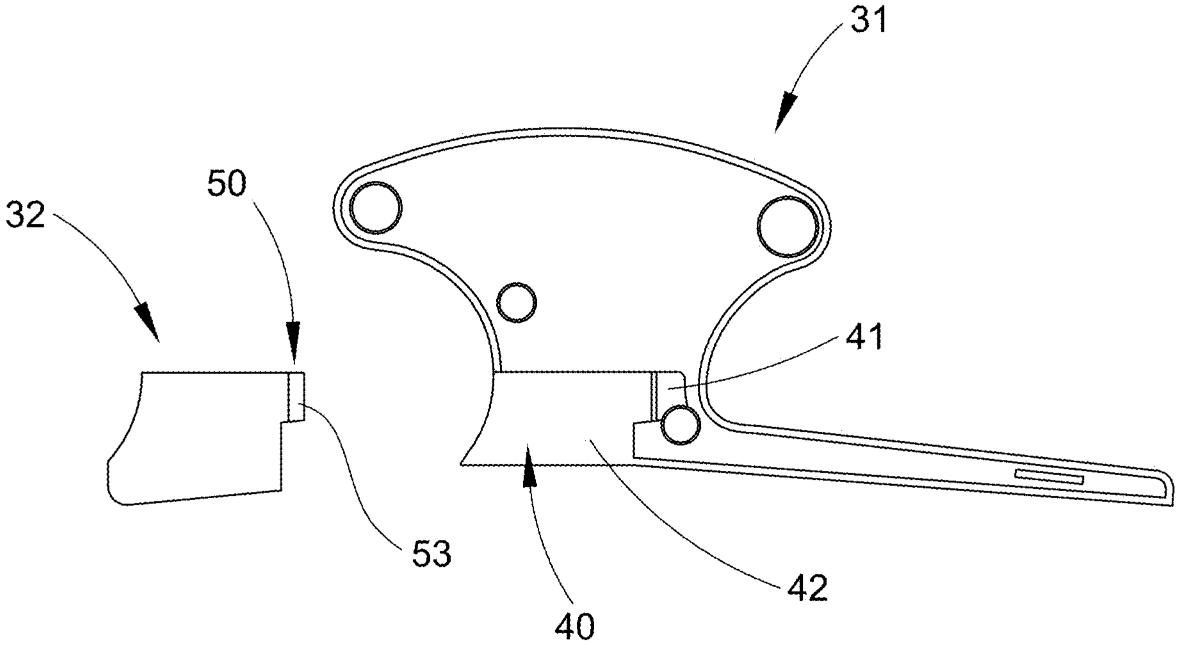
FIG. 12 is an exploded view of the side cover of the second embodiment of the present invention.
Figure 13:
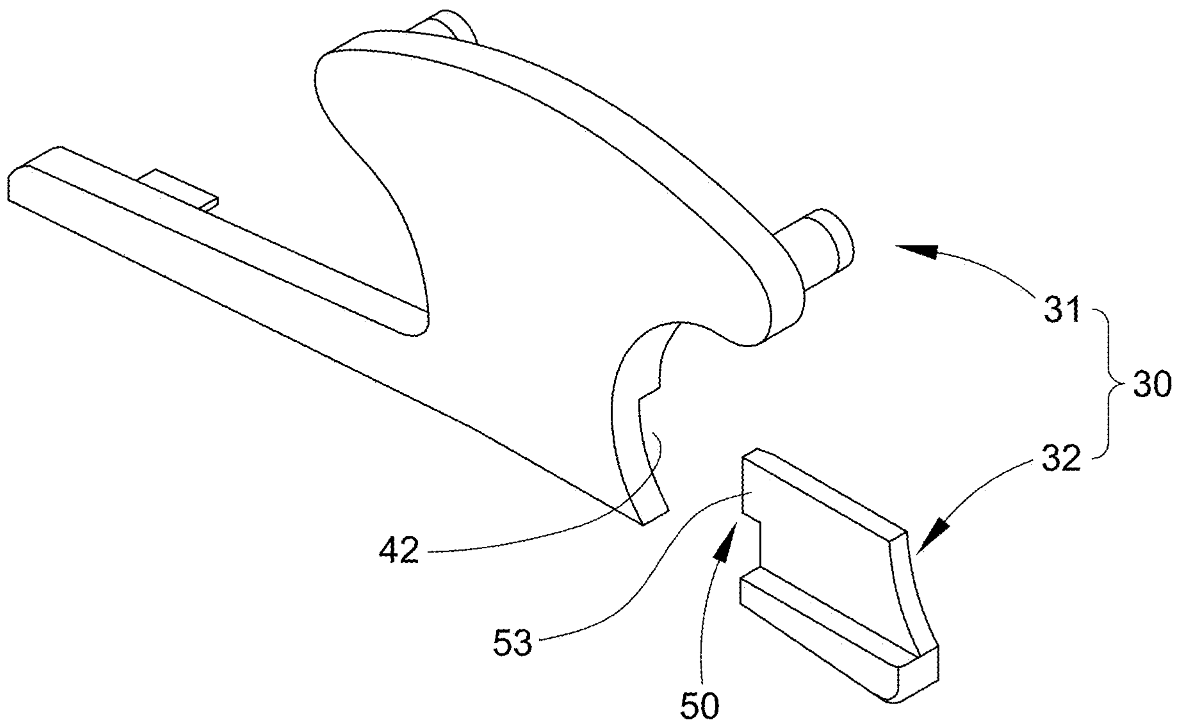
FIG. 13 is another angle exploded view of the side cover of the second embodiment of the present invention.

As shown in FIGS. 11 to 13, this is a second embodiment of the present invention. It differs from the first embodiment in that the interlocking member 50 has a locking tab 53, and the channel 42 is recessed on the inner surface of the first cover body 31 and connected to one side of the first cover body 31. The interlocking member 50 is inserted into the assembly slot 40 along the second direction A2 so that when the interlocking member 50 is fully inserted into the channel 42, the locking tab 53 corresponds to and interlocks with the retention groove 41.

Figure 14:
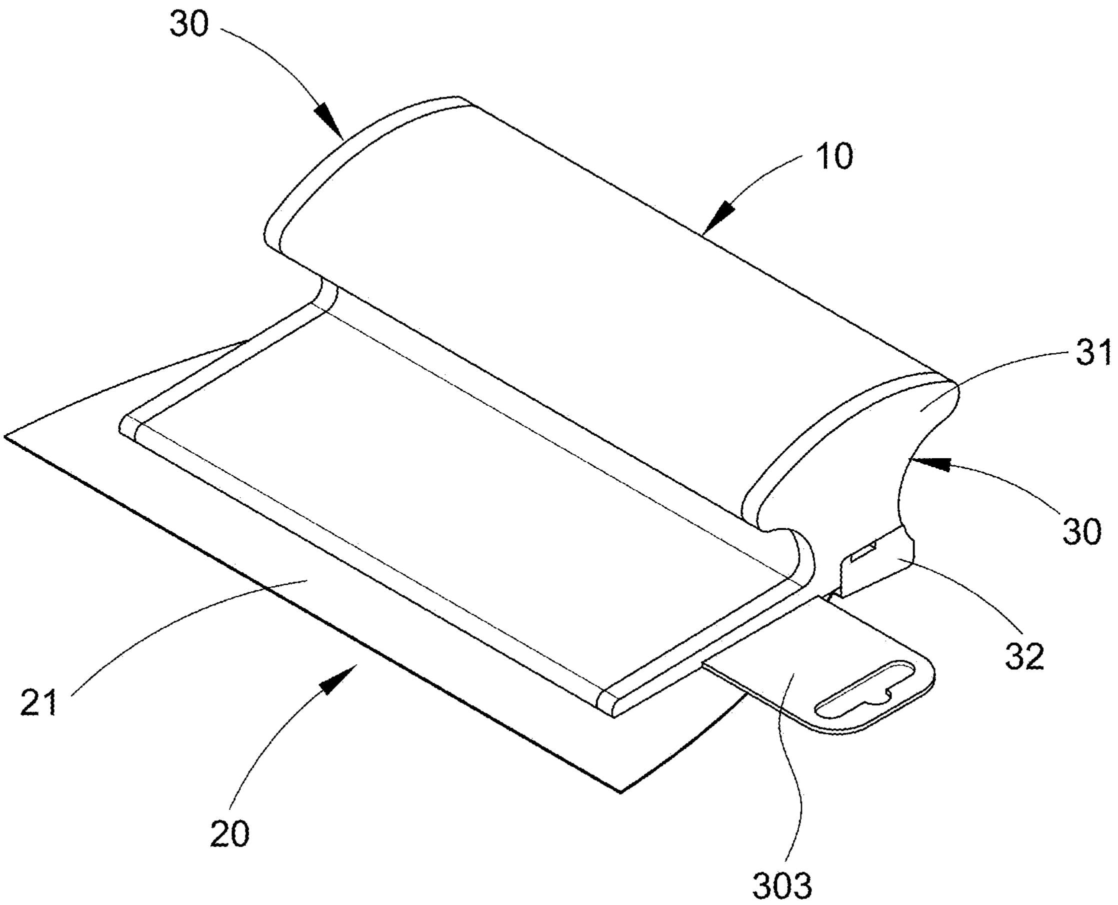
FIG. 14 is a schematic perspective view of the third embodiment of the present invention.

As shown in FIG. 14, which is a third embodiment of the paint tool with a replaceable blade of the present invention. The difference from the above embodiments is that at least one side cover 30 has a suspension element 303. The suspension element 303 protrudes from the outer surface of the side cover 30, making it convenient to store the paint tool of the present invention without taking up space. For example, the suspension element 303 can be disposed on the outer surface of the first cover body 31, thereby achieving the hanging function without affecting the detachability of the second cover body 32.

From the above description, it can be seen that the present invention achieves the removal or replacement of the blade 20 through the detachment of the second cover body 32, thereby solving the problem of inconvenient blade removal in the conventional structures. In addition, since the assembly direction of the second cover body 32 is different from the direction in which the side cover 30 is assembled to the main body 10, it does not have to bear the force when the paint tool is hung. Therefore, it can achieve easy assembly and disassembly by simple interlocking.

What is claimed is:

1. A paint tool with a replaceable blade comprising:

a main body comprising a grip section, a support surface, a blade retaining flange, and two engagement recesses, wherein the grip section and the blade retaining flange are respectively disposed at a top and bottom of one side of the support surface, an insertion slot is formed between the support surface and the blade retaining flange, and the two engagement recesses are respectively recessed on two end faces of the main body;

a blade comprising a cutting edge and a blade mounting portion connected to the cutting edge, wherein the blade mounting portion is detachably assembled with the insertion slot; and two side covers assembled in the two engagement recesses, respectively, which prevent the blade from being disengaged from the insertion slot along a first direction, and at least one of the side covers comprises a first cover body and a second cover body, wherein the second cover body is detachably disposed on one side of the first cover body and corresponds to the insertion slot;

wherein when the second cover body is detached, the blade is configured to disengage from the insertion slot along the first direction; and wherein an interlocking structure is provided between the first cover body and the second cover body, the interlocking structure comprising an assembly slot and an interlocking member, at least one retention groove is provided in the assembly slot, and the interlocking member is used to be inserted into the assembly slot and interlocked with the retention groove.

2. The paint tool with a replaceable blade according to claim 1, wherein the support surface comprises a first side and a second side, and the insertion slot comprises an opening; the grip section and the blade retaining flange are disposed on the first side, and the opening faces the second side; the opening comprises a blade stop for restricting the blade from moving along a second direction, and the second direction intersects with the first direction.

3. The paint tool with a replaceable blade according to claim 1, wherein the interlocking member is inserted into the assembly slot along a second direction or a third direction, and both the second direction and the third direction intersect with the first direction.

4. The paint tool with a replaceable blade according to claim 1, wherein the second cover body also comprises a release mechanism.

5. The paint tool with a replaceable blade according to claim 1, wherein the assembly slot is further provided with a channel, and the retention groove is connected to the end of the channel; when the interlocking member is pushed by the inner wall of the channel, the interlocking member exhibits an elastically deformable contracted state, and when the interlocking member corresponds to the retention groove, the interlocking member returns to an initial state.

6. The paint tool with a replaceable blade according to claim 5, wherein the interlocking member comprises a pair of extending arms and a pair of interlocking protrusions, the pair of extending arms are made of an elastically deformable material and are spaced apart from each other, and one end of the extending arms is connected to the second cover body, while the other end is connected to the interlocking protrusions.

7. The paint tool with a replaceable blade according to claim 6, wherein the outer side of the interlocking protrusion also comprises a connected first guide slope and second guide slope, the first guide slope is used to guide the interlocking member into the channel, while the second guide slope is used to guide the interlocking member out of the retention groove.

8. The paint tool with a replaceable blade according to claim 5, wherein the maximum width of the interlocking member is greater than the inner diameter of the channel.

9. The paint tool with a replaceable blade according to claim 1, wherein at least one of the side covers has a suspension element, which protrudes from the outer surface of the side cover.

* * * * *